United States Patent [19]

Ohga et al.

[11] Patent Number: 5,320,658
[45] Date of Patent: Jun. 14, 1994

[54] PROCESS OF DRAWING OPTICAL FIBER

[75] Inventors: Yuichi Ohga; Shinji Ishikawa; Hiroo Kanamori; Ichiro Yoshimura; Horoshi Yokota, all of Yokohama, Japan

[73] Assignee: Sumitomo Electric Industries, Ltd., Osaka, Japan

[21] Appl. No.: 921,991

[22] Filed: Aug. 3, 1992

Related U.S. Application Data

[63] Continuation of Ser. No. 720,420, Jun. 25, 1991, abandoned.

[30] Foreign Application Priority Data

Jun. 27, 1990 [JP] Japan .................. 2-166763

[51] Int. Cl.$^5$ .................................. C03B 37/023
[52] U.S. Cl. ............................. 65/3.11; 65/32.5
[58] Field of Search ............ 65/3.11, 2, 3.12, 3.2, 65/12, 32.5

[56] References Cited

U.S. PATENT DOCUMENTS

| | | | |
|---|---|---|---|
| 3,782,914 | 3/1974 | de Luca | 65/3.12 |
| 4,304,582 | 12/1981 | Aussenegg | 65/12 |
| 4,396,409 | 8/1983 | Bailey | 65/12 |
| 4,673,427 | 6/1987 | Geissen | 65/2 |
| 4,874,415 | 10/1989 | Boniort | 65/12 |

FOREIGN PATENT DOCUMENTS

| | | |
|---|---|---|
| 2817651 | 10/1979 | Fed. Rep. of Germany . |
| 54033738 | 3/1979 | Japan .................. 65/3.11 |
| 60-221337 | 11/1985 | Japan . |
| 63-129035 | 6/1988 | Japan . |

Primary Examiner—Robert L. Lindsay
Attorney, Agent, or Firm—Cushman, Darby & Cushman

[57] ABSTRACT

There is provided a process of melt drawing an optical fiber from a preform therefor in which a heating furnace comprising a muffle tube inside thereof through which the optical fiber is passed is provided immediately below a melt drawing furnace to further draw the optical fiber while heated, and an interior of the muffle tube is kept in an atmosphere selected from the group consisting of an inert atmosphere, an atmosphere comprising oxygen gas and an atmosphere comprising hydrogen gas.

3 Claims, 4 Drawing Sheets

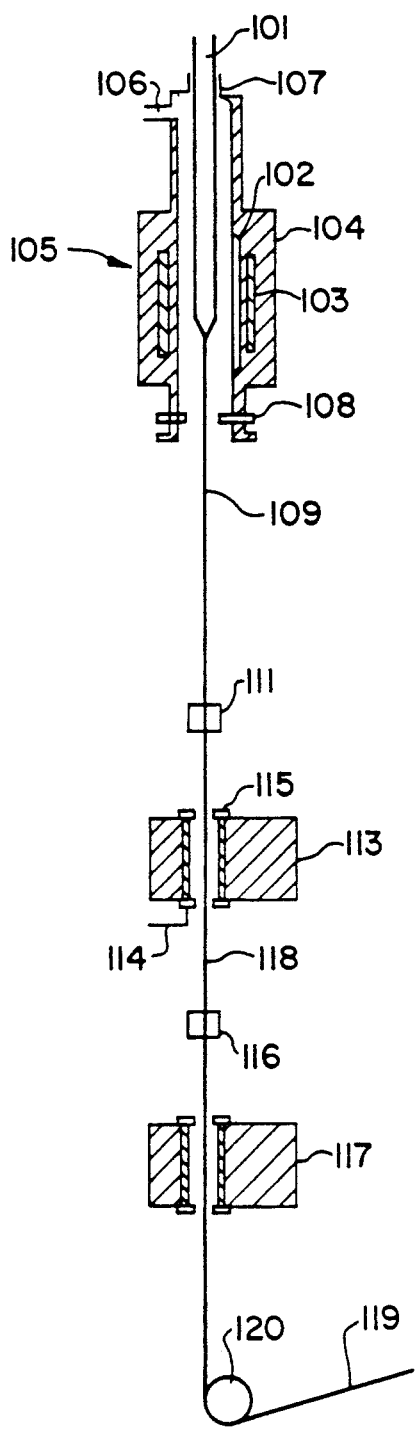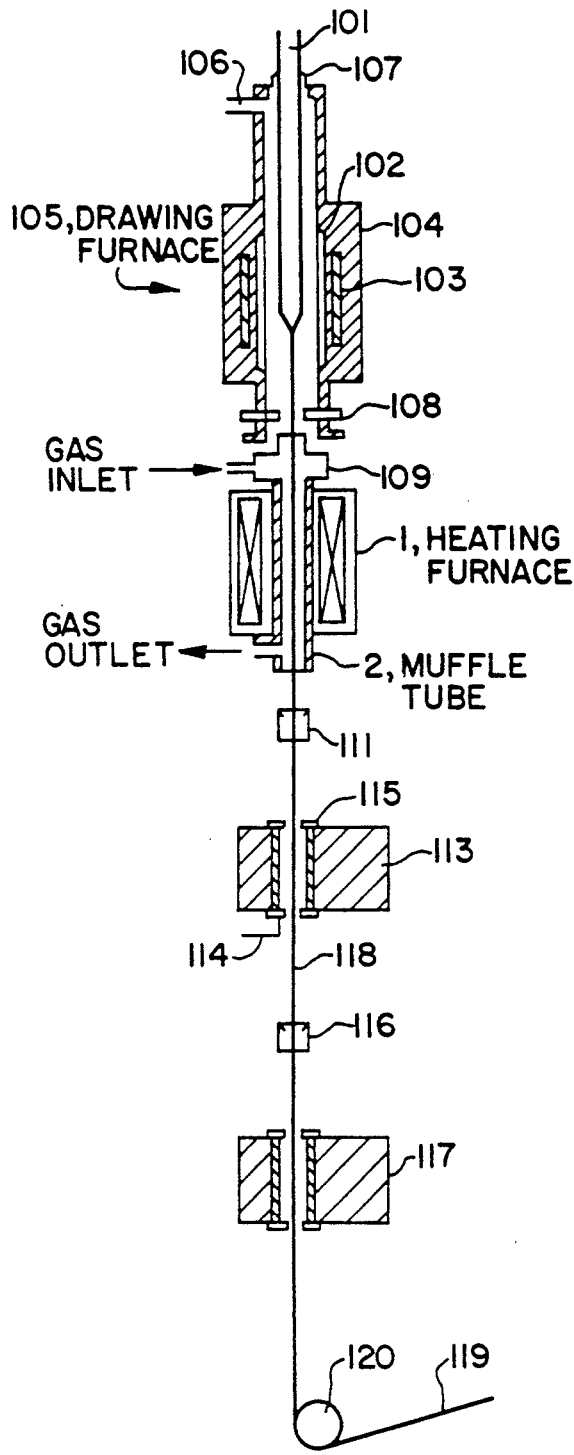

PROCESS OF DRAWING OPTICAL FIBER

This is a continuation of application Ser. No. 07/720,420, filed on Jun. 25, 1991, which was abandoned upon the filing hereof.

BACKGROUND OF THE INVENTION

1. Field of the Invention

The present invention relates to a process of drawing an optical fiber. In particular, the present invention relates to a process of drawing an optical glass fiber having increased reliability and reduced transmission loss by preventing formation of defects and decreasing thermal fluctuations in a molecular order or an atomic order in the glass fiber.

2. Description of the Related Art

When an optical glass fiber is conventionally drawn with melting a glass preform for the optical fiber, the preform is heated to a temperature above its softening point in a drawing furnace (or a melt drawing furnace) and the optical fiber is drawn from the preform followed by coating the fiber with a resin composition with a die after allowing the fiber to be air-cooled.

As shown concretely in FIG. 1 which schematically illustrates a drawing apparatus used in a conventional process of drawing the optical fiber, a muffle tube 102 into which a preform 101 for the optical fiber is inserted is supported by a furnace body 104 together with a carbon heater 103 surrounding the tube. To an upper end of the furnace body 104, is connected a purging gas tube 106 which supplies an inert gas such as nitrogen in the drawing furnace 105 in order to prevent degradation of the muffle tube 102 and the carbon heater 103 due to oxidation. A sealing ring 107 is fixed around an upper end surface of the furnace body 104 to be in sliding contact with an outer surface of the preform 101, and a shutter 108 is provided at a lower end of the furnace body 104, whereby an inert atmosphere can be kept in the drawing furnace 105. The optical fiber 109 drawn in the furnace 105 is passed through a coating die 111 and applied with a first coating of, for example, an ultraviolet curing resin. The ultraviolet curing resin which passes through the coating die 111 together with the optical fiber is cured by irradiation of ultraviolet in an ultraviolet curing device 113 so as to integrate the resin with the optical fiber 109. At a lower end of the device 113, a tube 114 is provided which supplies a purging gas such as nitrogen to exclude oxygen which adversely affects the curing of the resin. In connection with the gas tube, a shutter 115 is provided at an upper end of the device 115 in order to prevent outflow of the purging gas from the device 113. In addition, along the downstream from the curing device 113, another coating die 116 for a second coating and another curing device 117 are provided in turn, so that the optical fiber 118 coated with the first coating is converted to an optical fiber 119 which is further coated with the second coating. The optical fiber 119 is wound up by a winder (not shown) via a direction changing roller 120.

In the conventional process, since the optical fiber is drawn directly into an atmosphere at an ambient temperature from the drawing furnace, defects are fixed and remain in the fiber due to quenching of the optical fiber. In addition, since the glass preform is kept in the furnace at a high temperature (higher than 2000° C.), thermal fluctuations in the glass are promoted. Solutions to overcome these problems are highly desired in order to reduce a transmission loss of the optical fiber and to make the reliability of the optical fiber higher by means of preventing the increase of the transmission loss over a long period.

SUMMARY OF THE INVENTION

It is an object of the present invention to provide a process of drawing an optical fiber having higher reliability and reduced transmission loss which overcomes the problems as described above.

According to the present invention, there is provided a process of melt drawing an optical fiber from a preform therefor in which a heating furnace comprising a muffle tube inside thereof through which the optical fiber is passed is provided immediately below a melt drawing furnace to further draw the optical fiber while heated, and an interior of the muffle tube is kept in an atmosphere selected from the group consisting of an inert atmosphere, an atmosphere comprising oxygen gas and an atmosphere comprising hydrogen gas.

BRIEF DESCRIPTION OF THE DRAWINGS

FIG. 1 schematically shows an apparatus of drawing an optical fiber with which the conventional process is carried out, FIG. 2 schematically shows an apparatus of drawing the optical fiber with which the present process is carried out.

DETAILED DESCRIPTION OF THE DRAWINGS

Figure 4:
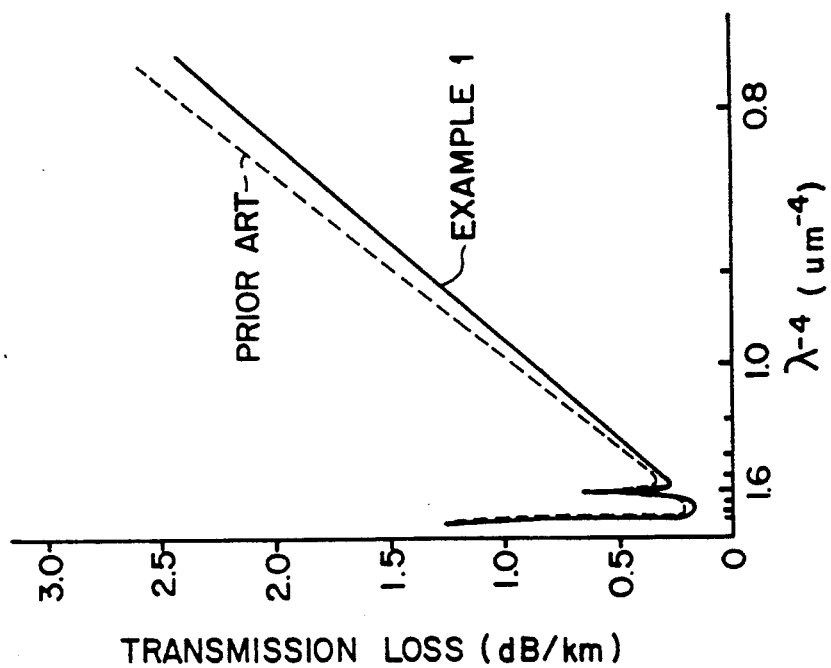
FIG. 4 is a graph in which transmission losses are plotted against $\lambda^{-4}$ to compare the present process with the conventional one.

In the present process, it is especially preferable that a temperature in the heating furnace is in the range of 500° to 1500° C., a temperature of the optical fiber immediately before entering the heating furnace is in the range of 500° to 1500° C., and a residence time of the optical fiber in the heating furnace is in the range of 0.1 to 10 seconds.

In addition, at least one heating furnace is provided immediately below the melt drawing furnace in the present process. When a plurality of the heating furnaces are provided, it is particularly preferred for an efficient operation that a temperature of each heating furnace can be independently controlled.

The muffle tube in the present invention is preferably made of quartz, high purity carbon, pyrolytic graphite-coated high purity carbon or SiC-coated high purity carbon.

Proper scattering in glass can be expressed by the following equation (see S. SAKKA, I. KITANO (Editor), "Glass Handbook," ASAKURA SHOTEN, Tokyo, JAPAN, 1975, p. 954):

$$\tau = 8\pi^3/3\lambda^4(n^2-1)\kappa T\beta + 16\pi^3 n/3\lambda^4(n/c)^2 \Delta c^2 \delta V \qquad (1)$$

wherein n is a refractive index of the glass, $\kappa$ is the Boltzmann's constant, $\beta$ is a compression ratio, T is a hypothetical temperature fixed to around an annealing temperature, $\Delta c^2$ is a mean square value of a concentration fluctuation and $\delta V$ is a volume of the fluctuating portion.

The first term of the above equation (1) is based on a density fluctuation derived from a temperature fluctuation kept in a supercooled condition upon solidification of the glass from a liquid state. The second term is based on the concentration fluctuation derived from a composition variation.

According to the present invention, quenching of the optical fiber from a higher temperature is avoided by re-heating the optical fiber immediately below the melt drawing furnace. As a result, the hypothetical temperature of the first term of the equation (1) is lowered, which efficiently serves to decrease the proper scattering $\tau$ in the fiber.

When an defect density of the optical fiber is measured with ESR (Electron Spin Resonance), the optical fiber drawn by the conventional process had an E' center ($\equiv$Si.) density of $1.09 \times 10^{14}$ spins/g, while the optical fiber drawn with re-heating in the heating furnace immediately below the drawing furnace according to the present invention had the E' center density of $6.76 \times 10^{13}$ spins/g. That is, with the re-heating treatment, the E' centers were seemed to be re-bonded each other in accordance with the following formula (2):

$$\equiv Si. + .Si \equiv \rightarrow (heat) \rightarrow \equiv Si-Si \equiv \qquad (2)$$

In view of the above, it is certified that the reheating of the optical fiber efficiently works so as to reduce the defects therein.

It is also assumed that, in addition to the E' center, a non-crosslinked oxygen radical such as $\equiv$Si—O., $\equiv$Si—O—O. and so on also can be re-bonded to form $\equiv$Si—O—Si$\equiv$ and $\equiv$Si—O—O—Si$\equiv$, whereby the optical fiber having a stable structure can be produced.

In the present process, any atmosphere in which the optical fiber is re-heated may be used by providing the muffle tube in the heating furnace.

In the case where the heating (or re-heating) atmosphere in the muffle tube comprises He, N$_2$, Ar and so on, the lower a linear velocity of the optical fiber passed through the heating furnace is, the smaller the defect density is.

Further, the re-heating atmosphere comprising oxygen or hydrogen is also efficient for reducing the defects. That is, for example, following three reactions (3) to (5) seem to proceed:

$$\equiv Si. + \tfrac{1}{2}H_2 \rightarrow \equiv Si-H \qquad (3)$$

$$\equiv Si-O. + \tfrac{1}{2}H_2 \rightarrow \equiv Si-OH \qquad (4)$$

$$2\equiv Si. + \tfrac{1}{2}O_2 \rightarrow \equiv Si-O-Si\equiv \qquad (5)$$

Since a diffusion coefficient of H$_2$ is larger than that of O$_2$, H$_2$ diffuses into a core portion of the fiber more easily than O$_2$ so that the defects ($\equiv$Si.) present in a pure silica core portion seemed to be killed by H$_2$.

The re-heating temperature in the heating furnace in the present process is preferably in the range of from 500° to 1500° C. When the temperature is lower than 500° C., sufficient effect due to the re-heating cannot be expected. On the contrary, when the temperature is above 1500° C., the optical fiber is deformed due to such high temperature, whereby the drawing is impossible.

From the above view points, the temperature of the optical fiber which enters the heating furnace is also preferably in the range of from 500° to 1500° C.

As to the re-heating time, i.e. a residence time, of the optical fiber in the heating furnace, when the time is less than 0.1 sec., the sufficient effects by the reheating treatment cannot be expected. When the optical fiber is gradually cooled over a period longer than 10 sec., it is not practical in view point of designing the drawing apparatus.

At least one heating furnace is provided in series below the drawing furnace. Alternatively, at least one heater is provided in the heating furnace. When a plurality of heating furnaces or heaters are provided, it is preferable that the temperature of each furnace (or heater) can be independently controlled whereby stepwise annealing effects can be promoted.

The muffle tube used in the present invention is preferably made of, for example, quartz, high purity carbon, pyrolytic graphite-coated high purity carbon, SiC-coated high purity carbon.

Though the present invention will be described with reference to some examples, it is not limited to them.

EXAMPLE 1

FIG. 2 schematically shows an apparatus used in the present invention, in which the reference numbers corresponding to those in FIG. 1 represent the corresponding parts of the apparatus in FIG. 1. In this apparatus, a heating furnace 1 of a length of 60 cm was provided just and immediately below the melt drawing furnace 105, and a die 111 was separated from the heating furnace 1 by 60 cm. The heating furnace comprised a muffle tube 2 made of quartz with a gas inlet and a gas outlet so that a desired atmosphere can be kept in the muffle tube. As the heating furnace 1, a SiC (Siliconit ®) furnace (commercially available from Siliconit Konetsu Kogyo Co. Ltd., Japan) was used.

A glass preform 101 for a single mode optical fiber consisting of a core of pure silica and a cladding of fluorine-doped silica was heated to a temperature higher than its softening point in the drawing furnace and the optical fiber 10 was drawn from the preform. The temperature of the optical fiber just before entering the heating furnace was 1100° C. Then, the heating furnace was controlled to a temperature of 1200° C. A quartz lube having an outer diameter of 40 mm was used as the muffle tube 2, and He gas was supplied in the muffle tube at a rate of 3 1/min. The optical fiber was passed through the heating furnace at a controlled linear velocity of 30 m/min., so that the residence time of the optical fiber in the heating furnace was 1.2 sec.

Figure 3:
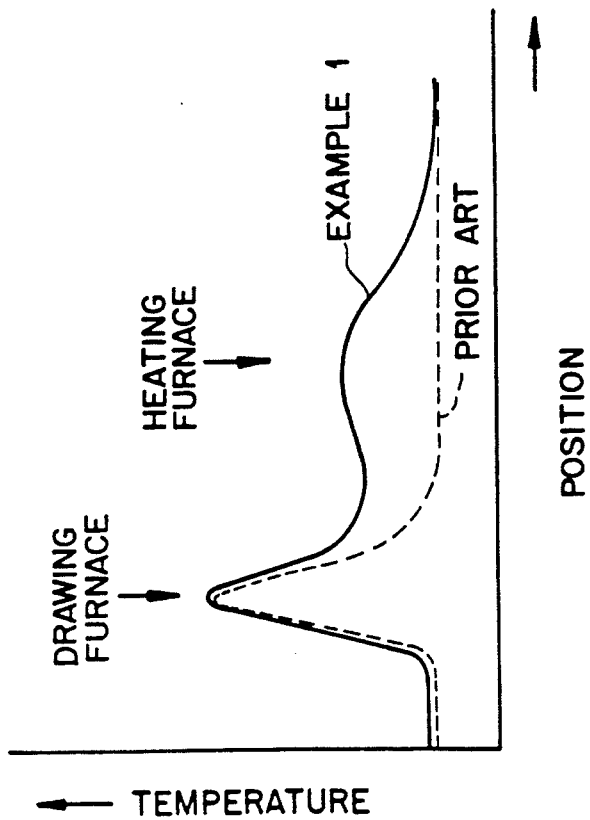
FIG. 3 is a graph which compares temperature distributions between the present process and the conventional process.

A solid line in FIG. 3 shows a temperature distribution along a running direction of the optical fiber through the drawing furnace and the heating furnace to an ultraviolet curing device. A broken line in FIG. 3 represents a temperature distribution in the conventional process where the same conditions as described above were employed except that the heating furnace was not present.

Transmission losses of the optical fibers according to the present invention and the conventional process were measured, and proper scatterings were evaluated.

In addition, the E' center (Si·) density, which is a measure of the defect density, was determined with ESR.

A solid line in FIG. 4 represents a plot of $1/\lambda^4$ of the loss wavelength property for the present invention. (A gradient of the curve means the Rayleigh scattering). A broken line in FIG. 4 represents the transmission loss of the optical fiber produced by the conventional process. It is seen that the scattering factor of the conventionally made optical fiber is 0.95 dB/km·μm$^4$, while that of the optical fiber made according to the present invention is reduced to 0.88 dB/km·μm$^4$.

Figure 5:
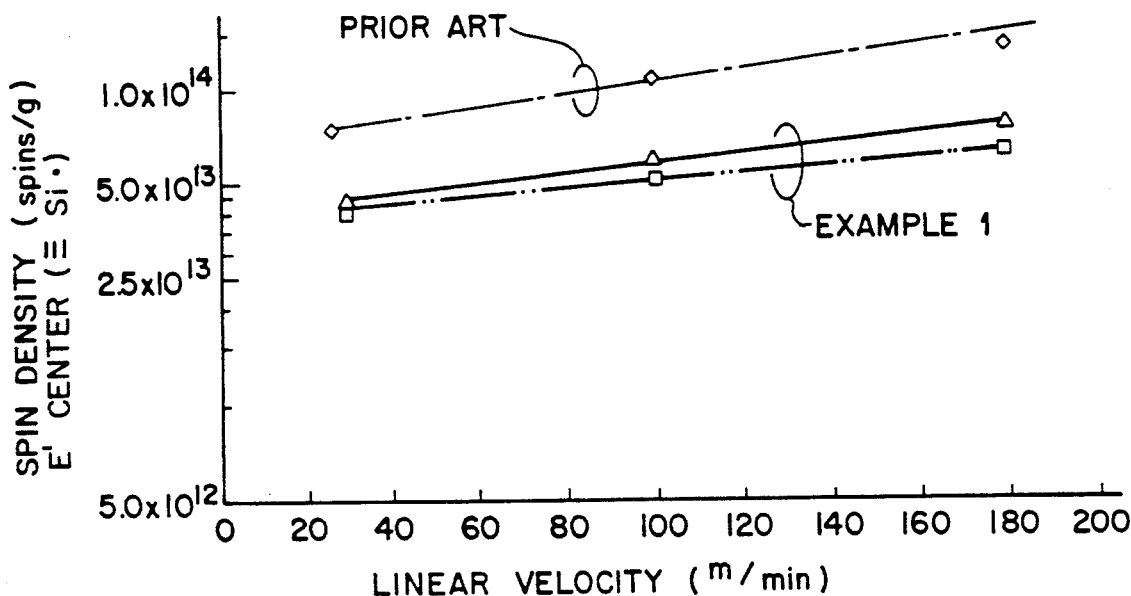
FIG. 5 is a graph showing comparison between E' center densities of the optical fiber made in accordance with the present process and one made by the conventional process.

FIG. 5 shows the E' center density plotted against the drawing rate, in which a solid line and a two-dot chain line represent the cases of the present process and a dashed line represents the case of the conventional process. Not only at the drawing rate of 30 m/min of Example 1, but also at the other higher drawing rates, the E' center densities were smaller when the optical fiber was drawn with placing the heating furnace immediately below the drawing furnace.

A residual stress was also measured to be 2 kgf/mm$^2$ in the case of the present optical fiber, while 5 kgf/mm$^2$ in the case of the conventional optical fiber. It is clear that the residual stress is reduced by the re-heating treatment.

EXAMPLE 2

Example 1 was repeated except that the atmosphere in the heating furnace consisted of 100% of hydrogen. The E' center density of the optical fiber produced in Example 2 was determined with ESR and found to be less than a detection limit of ESR. It is assumed that hydrogen molecule diffused into the glass and a reaction occurred as follows:

Figure 6:
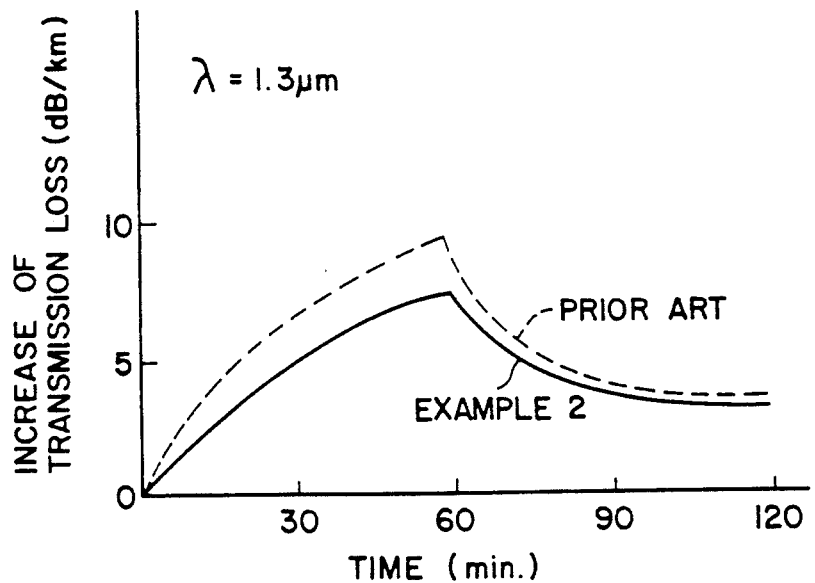
FIG. 6 is a graph showing comparison between resistance properties against $\gamma$-ray of the optical fiber made in accordance with the present process and one made by the conventional process, and FIG. 7 schematically shows an optical fiber drawing apparatus used in the present process in which a plurality of heaters are used each heating temperature of which can be controlled independently.

The optical fiber produced in Example 2 was tested on γ-ray resistance. The fiber was irradiated to a dose rate of 10$^5$ R/hour for one hour. The results are shown in a graph of FIG. 6 in which a solid line represents the results from the fiber of Example 2 and a broken line represents those from the fiber of the conventional process. It is confirmed that the present process suppress the increase of the transmission loss due to γ-ray irradiation.

EXAMPLE 3

Example 1 was repeated except that the atmosphere in the heating furnace consisted of 100% of oxygen. The E' center density of the optical fiber produced in Example 3 was determined with ESR and found to be less than the detection limit of ESR. It is assumed that oxygen molecule diffused into the glass and a reaction occurred as follows:

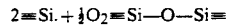

EXAMPLE 4

Figure 7:
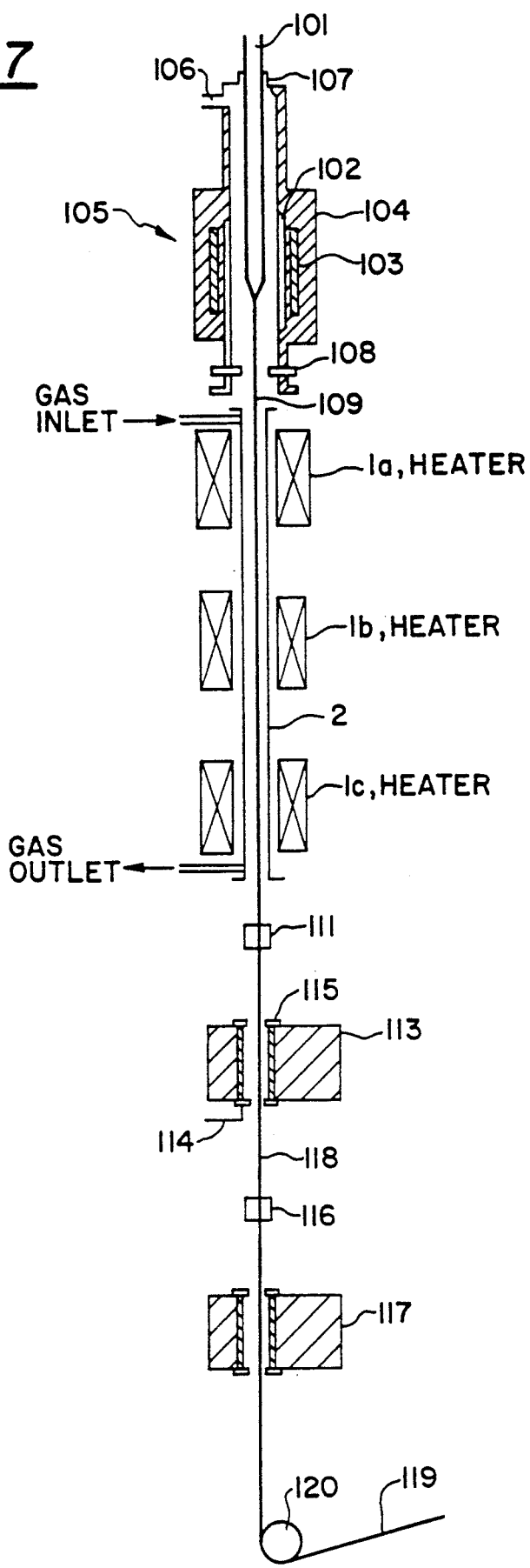

Using an apparatus comprising a heating furnace as shown in FIG. 7, an optical fiber was produced. The heating furnace comprised a plurality of heaters 1a, 1b and 1c each temperature of which can be controlled separately. The heating temperature of each heater was controlled as follows: The heater 1a 1500° C.; the heater 1b 1200° C.; and the heater 1c 900° C. He was supplied at a rate of 600 ml/min. in the muffle tube 2 and the other conditions were the same as in Example 1.

The same measurements as in Example 1 were carried out on the optical fiber produced in Example 4. The E' center density was reduced to 2.14×10$^{13}$ spins/g (at a linear velocity of 30 m/min.). In Example 4, a period during cooled to an ambient temperature can be prolonged by controlling the heating temperature of each heater separately, so that the annealing effect can be promoted. The Rayleigh scattering factor was 0.85 dB/km·μm$^4$.

Though, in above examples, the SiC Siliconite furnace was used, any other heating furnace can be used as long as it can heat the fiber to a desired temperature. For example, an electric resistance furnace with a carbon heater and a Kanthal super-heatering furnace (with a quartz made muffle tube) can be used.

As to the muffle tube, a proper material can be selected from the group consisting of carbon, quartz, pyrolytic graphite-coated carbon, SiC-coated carbon and so on.

Though, in above examples, the present invention has been described with reference to the pure silica core/fluorine-added silica cladding single mode optical fiber as an example, the same results as described above are obtained in the case where the core and/or the cladding of the optical fiber contain other additives such as Ge, P, F or Al.

As described above, according to the present invention, the optical fiber having the stable transmission properties and the stable resistive properties against circumstances can be obtained since the just drawn optical fiber is gradually cooled through the heating furnace without being quenched from the drawing temperature so that the thermal fluctuations and the defects during softening of the glass are not fixed in the glass.

What is claimed is:

1. A process of drawing an optical glass fiber from a quartz based preform comprising the steps of:
    i) heating the preform in a series of furnaces including at least a drawing furnace and a heating furnace which is immediately below the drawing furnace, the heating furnace which is kept at a temperature in the range of from 500° C. to 1500° C. and contains a muffle tube having an atmosphere consisting essentially of hydrogen gas; and
    ii) drawing the optical glass fiber such that said fiber passes through the drawing furnace and the heating furnace which contains the muffle tube, wherein the fiber immediately before entering the heating furnace has a temperature in the range of from 500° to 1500° C. and has a residence time within the heating furnace in the range of from 0.1 to 10 seconds.

2. The process according to claim 1 wherein the number of the heating furnace is at least one and when a plurality of heating furnaces are provided, a temperature of each heating furnace can be controlled independently.

3. The process according to claim 1 wherein the muffle tube is made of a material selected from the group consisting of quartz, high purity carbon, pyrolytic graphite-coated carbon and SiC-coated high purity carbon.

* * * * *

UNITED STATES PATENT AND TRADEMARK OFFICE
CERTIFICATE OF CORRECTION

PATENT NO. : 5,320,658
DATED : June 14, 1994
INVENTOR(S) : OHGA et al

It is certified that error appears in the above-indentified patent and that said Letters Patent is hereby corrected as shown below:

On the title page:

Please change Item [75] to read as follows:

--[75]  Inventors:  Yuichi Ohga; Shinji Ishikawa; Hiroo Kanamori; Ichiro Yoshimura; Hiroshi Yokota, all of Yokohama, Japan--

Signed and Sealed this

Twenty-eight Day of March, 1995

Attest:

BRUCE LEHMAN

Attesting Officer

Commissioner of Patents and Trademarks